(12) United States Patent
Althöfer

(10) Patent No.: US 7,690,113 B2
(45) Date of Patent: Apr. 6, 2010

(54) PROCESS FOR PRODUCING A HIGH TEMPERATURE-RESISTANT STRUCTURE WITH APPLICATION OF LUBRICANT

(75) Inventor: Kait Althöfer, Wiehl (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 355 days.

(21) Appl. No.: 11/590,602

(22) Filed: Oct. 30, 2006

(65) Prior Publication Data

US 2007/0074393 A1    Apr. 5, 2007

Related U.S. Application Data

(63) Continuation of application No. PCT/EP2005/004337, filed on Apr. 22, 2005.

(30) Foreign Application Priority Data

Apr. 29, 2004    (DE) .................. 10 2004 021 038

(51) Int. Cl.
  *B21D 39/00*   (2006.01)
  *B21D 53/00*   (2006.01)
  *B23K 1/20*    (2006.01)
  *B23K 20/00*   (2006.01)
  *B23K 31/02*   (2006.01)
  *B23P 15/26*   (2006.01)

(52) U.S. Cl. .............. 29/890.039; 29/505; 29/890; 29/890.08; 228/181; 228/183; 228/194; 228/208; 422/176; 422/177; 422/178; 422/180; 428/593; 428/594

(58) Field of Classification Search ............ 29/505, 29/890, 890.039, 890.08; 228/181, 183, 228/194, 208; 472/176–178, 180; 428/593–594
See application file for complete search history.

(56) References Cited

U.S. PATENT DOCUMENTS

| | | | |
|---|---|---|---|
| 4,273,681 A | 6/1981 | Nonnenmann | |
| 4,832,998 A | 5/1989 | Cyron | |
| 4,923,109 A | 5/1990 | Cyron | |
| 5,082,167 A * | 1/1992 | Sadano et al. | 228/258 |
| 5,105,539 A | 4/1992 | Maus et al. | |
| 5,139,844 A | 8/1992 | Maus et al. | |
| 6,199,749 B1 * | 3/2001 | Wieres et al. | 228/181 |
| 6,811,071 B2 | 11/2004 | Caspar et al. | |
| 7,101,602 B2 * | 9/2006 | Althöfer et al. | 428/116 |
| 2001/0013390 A1 | 8/2001 | Staubwasser | |

(Continued)

FOREIGN PATENT DOCUMENTS

DE    29 02 779 A1    7/1980

(Continued)

*Primary Examiner*—David P Bryant
*Assistant Examiner*—Alexander P Taousakis
(74) *Attorney, Agent, or Firm*—Laurence A. Greenberg; Werner H. Stemer; Ralph E. Locher

(57) ABSTRACT

A process for producing a high temperature-resistant structure provides at least one at least partially structured metallic layer. A smooth metallic layer is deformed by a rolling process, in which oil at least partially wets the at least one layer. The oil is at least partially removed. Lubricant is fed onto at least one subsection of the at least one layer. A structure is at least partially shaped. Technical joining connections are produced for fixing the structure.

10 Claims, 2 Drawing Sheets

U.S. PATENT DOCUMENTS

| | | |
|---|---|---|
| 2002/0129890 A1 | 9/2002 | Staubwasser |
| 2003/0075590 A1 | 4/2003 | Caspar et al. |

FOREIGN PATENT DOCUMENTS

| | | |
|---|---|---|
| DE | 196 42 946 A1 | 4/1998 |
| DE | 10122082 * | 6/2001 |
| DE | 101 51 487 C1 | 10/2002 |
| EP | 0 245 737 B1 | 8/1989 |
| EP | 0 422 000 B2 | 5/2001 |
| EP | 1 557 545 A2 | 5/2001 |
| WO | WO 90/03220 | 4/1990 |
| WO | WO 93/25339 | 12/1993 |
| WO | WO 02/090734 A1 | 11/2002 |

* cited by examiner

PROCESS FOR PRODUCING A HIGH TEMPERATURE-RESISTANT STRUCTURE WITH APPLICATION OF LUBRICANT

CROSS-REFERENCE TO RELATED APPLICATIONS

This is a continuation, under 35 U.S.C. § 120, of copending international application No. PCT/EP2005/004337, filed Apr. 22, 2005, which designated the United States; this application also claims the priority, under 35 U.S.C. § 119, of German patent application No. DE 10 2004 021 038.1, filed Apr. 29, 2004; the prior applications are herewith incorporated by reference in their entirety.

BACKGROUND OF THE INVENTION

Field of the Invention

The present invention relates to a process for producing a structure which is high-temperature resistant or able to withstand high temperatures and includes at least one at least partially structured metallic layer. Such structures which are high temperature-resistant are used in particular as carrier bodies for catalytic converters, as adsorbers, as particulate filters or in a similar manner in the automotive industry.

Structures of that type which are high temperature-resistant are in many cases also referred to as honeycomb bodies. They usually include at least one smooth and at least one corrugated metallic layer, which are positioned in such a way with respect to one another that they form flow passages for the exhaust gas to pass through. The surfaces of those layers or passages are then provided with at least one predetermined coating, which converts harmful constituents of the exhaust gas into less harmful components. The profile or corrugation of the at least one layer in that configuration realizes a relatively large surface area per unit volume of the structure, thereby allowing intimate contact between the exhaust gas and the (un)coated surface. The conversion generally takes place at relatively high temperatures. The exhaust gas which flows through it as a result of the temperature reaches temperatures of, for example, up to 1,000° C. In addition to the high thermal loading, during operation in the exhaust system of a mobile internal combustion engine, the structure is also exposed to high dynamic loads, which are caused, for example, by pressure surges of the exhaust gas itself, resulting from combustion, or external excitation when the vehicle is driving.

Numerous forms of honeycomb bodies which are wound or stacked from metallic layers and then joined are known. A distinction is drawn in particular between two typical forms of honeycomb bodies of that type. An earlier form, of which German Published, Non-Prosecuted Patent Application DE 29 02 779 A1, corresponding to U.S. Pat. No. 4,273,681, shows typical examples, is the helical form, in which substantially just one smooth and one corrugated sheet metal layer are placed on top of one another and then wound up helically. In another form, the honeycomb body is assembled from a plurality of alternately disposed smooth and corrugated or differently corrugated sheet metal layers, with those sheet metal layers being stacked to form one or more stacks which are then wound or twisted together. Unlike in the case of the helical form, in that form all of the ends of the sheet metal layers come to bear on the outside against a housing or tubular casing, where they can be permanently fixed. Typical examples of that latter form are described in European Patent Application 0 245 737 A1, corresponding to U.S. Pat. Nos. 4,832,998 and 4,923,109, or International Publication No. WO 90/03220, corresponding to U.S. Pat. Nos. 5,105,539 and 5,139,844, which have also been referred to, for example, as an S shape. For a more detailed description of the nature or configuration of the different structures or honeycomb bodies, reference can be made for explanation to the contents of the disclosure of the above-mentioned publications.

In order to produce a honeycomb body or a structure of that type which is high temperature-resistant, at least some of the layers have to be joined to one another. Various technical joining techniques are known for that purpose. In particular, various brazing processes have proven suitable for producing permanent joints, due to the high thermal and dynamic loads on the structure during its preferred use in exhaust systems of mobile internal combustion engines. For those brazing purposes, it is necessary for a brazing material, the melting point of which is usually lower than that of the metallic layers, to be introduced into the honeycomb body and positioned at the desired joining portions. Heating the honeycomb body to above the melting point of the brazing material ultimately melts the latter, so that it joins the adjacent metallic layers to one another as it cools. The preferred manner of producing the technical joining connection is by brazing. However, a sintering process or even welding may be used as well.

The brazing material can be introduced into the honeycomb body in various forms, for example as a brazing foil or sheet and/or brazing powder. A brazing foil or sheet is inserted and/or adhesively bonded in the regions in which layers are to be joined to one another. The brazing powder is likewise held on the surface of the layers through the use of a bonding agent (oil, glue, adhesive, etc.) until the actual brazing process takes place.

The bonding agents used are preferably adhesives, which have been specially developed for that purpose and are provided at the desired joining portions. A number of different techniques are known for that purpose. By way of example, European Patent Application 0 422 000 A1, corresponding to U.S. Patent Application Publication Nos. US 2001/0013390 and US 2002/0129890, discloses the application of the bonding agent using rotating rollers. In that case, the bonding agent is applied prior to the winding or stacking of the layers. Furthermore, it is known, for example from German Published, Non-Prosecuted Patent Application DE 101 51 487, corresponding to U.S. Patent Application Publication No. US 2003/0075590 and U.S. Pat. No. 6,811,071, to introduce bonding agents into the interior of a honeycomb structure of that type in liquid form by using capillary forces. That can be effected by simple immersion of the end side of the honeycomb structure in the bonding agent. For a more detailed description of the method used to apply bonding agent, reference may be made to the explanations given in the publications cited.

In order to form a profile or corrugation in the metallic layer, in many cases it is necessary to use operating media, which assist with the shaping. For example, corrugated sheet metal layers are often produced by using a shaping rolling process. Moreover, it should be borne in mind that the layers in many cases are stored and/or transported for a relatively long period of time, in which case they are likewise wetted with operating media in order to protect them. This type of operating medium is mainly oil, which may even adhere permanently to the surface of the layers. However, under certain circumstances the oil on the surface of such layers may have an adverse effect on the brazing process. By way of example, it is possible for the oil itself or a substance which forms as a result of ageing of the oil to have bonding properties causing brazing material to be retained by it at least temporarily during the operation of applying brazing material. Under certain circumstances, that may lead to the formation of technical joining connections at locations which are intended for the compensation of differential thermal expansion, and consequently endanger the long-term structural integrity of the component. It is also possible for the operating media or oils to include volatile components, which in particular impair a vacuum applied for the brazing process or a predetermined, defined atmosphere.

In view of those considerations, it has heretofore been customary either to use those operating media as bonding agents or to remove them altogether and provide a separate bonding agent, which in practice is then applied to a surface that has been cleaned or is devoid of operating media.

SUMMARY OF THE INVENTION

It is accordingly an object of the invention to provide a process for producing a high temperature-resistant structure from at least one at least partially structured metallic layer, with application of lubricant, which overcomes the hereinafore-mentioned disadvantages of the heretofore-known processes of this general type and which leads to the production of technical joining connections in the structure being as precise and accurately predeterminable as possible. At the same time, the handling or shaping of the metallic structure is preferably to be made easier and more reliable in process engineering terms, so that the operations which are required to perform the same can be realized with a high degree of accuracy even as part of series production. In addition, it is also intended to provide a process which leads to reduced quantities of brazing material and/or operating media being used.

With the foregoing and other objects in view there is provided, in accordance with the invention, a process for producing a high temperature-resistant structure. The process comprises the following steps:
  (a) At least one smooth metallic layer is deformed in a rolling process during which oil at least partially wets the at least one layer, to produce at least one at least partially structured metallic layer.
  (b) The oil is at least partially removed from the at least one at least partially structured metallic layer.
  (c) Lubricant is fed onto at least one subsection of the at least one at least partially structured metallic layer.
  (d) The at least one at least partially structured metallic layer is at least partially shaped into the structure.
  (e) Technical joining connections are produced for fixing the structure.

The term "oil" is to be understood as meaning operating media which have previously been used to store, transport and/or deform the at least one layer. These include in particular mineral oils, synthetic oils, greases, etc. One important aspect underlying the process according to the invention is the measure whereby first of all the oil is removed and then a lubricant, which may likewise include an oil, is applied again. The intention of this is for the previously undefined states or the oil-wetted regions which it has not heretofore been possible to verify to be eliminated and converted into clearly defined regions or created anew. In this way, accurately predetermined subsections are formed, in which the lubricant inter alia ensures that the layers or layer portions bearing against one another are able to slide along one another without damage during shaping of the structure. This applies in particular to the winding or coiling of stacks including a plurality of metallic layers of this type.

Due to the previous removal of unnecessary oil, the level of volatile components during the subsequent brazing process is considerably reduced. The proposed process in actual fact merely assists metallic layers in sliding along one another by providing a lubricant only in the desired regions, whereas in the other sub-regions a blank or differently coated surface is present. In this way, it is possible, for example, for a separate subsection including lubricants to be made available to each contact region of the metallic layers disposed adjacent one another.

With regard to step (a), it should be noted that a metallic layer encompasses both metal foils or sheets and other metallic layers, in particular grid structures, perforated plates, fiber non-wovens, and composite materials, etc.

A rolling process is to be understood as meaning in particular the processes by which a profile or corrugation is introduced into the smooth material by the external action of forces through the use of a tool (for example rotating profile rollers). The deformation is predominantly carried out in such a manner as to effect permanent plastic deformation. This in particular maintains the thickness of the deformed layers or materials as far as possible. This resulting corrugation is usually configured in such a way that it is repeated at defined intervals, for example as a type of sinusoidal corrugation, an omega corrugation, a sawtooth profile, etc. In order to deform the smooth metallic layer, it is advantageous for the latter to be fed continuously to a rolling tool. Deformation steps of this type can equally be carried out by using the stamping, pressing, etc. production processes, which are also encompassed herein, in particular if material cutting takes place at the same time as the deformation.

The oil (or similar operating medium), which is required for this purpose or is already present on the smooth metallic layer is at least partially removed following the deformation step. It is preferable for all of the oil on the surface to be removed, although it is also possible for the oil to be removed only in certain sub-regions, for example those in which in an additional coating is subsequently to be applied. The oil which is still present on the surface can, if appropriate, be pretreated (e.g. by chemical and/or thermal measures) and finally at least partially covered with the lubricant.

In principle, it is of no importance whether the individual process steps are carried out sequentially one after the other or under certain circumstances individual process steps are repeated. By way of example, it is possible for process steps (c) and (d) to be carried out alternately. This may, for example, take place in such a manner that smooth and structured layers are alternately stacked on top of one another, in which case lubricant is applied to defined subsections after each layer. Consequently, the stacking of the layers, which is to be configured as partial shaping of the structure, and the supplying of lubricants, are carried out alternately until the desired stack has been formed. The stack produced in this way can then be introduced into a housing, after which brazing material can be applied to it and then the stack can be heat-treated.

If a structure of this type that is high temperature-resistant is not produced by a brazing process, it is also possible to carry out a technical joining operating to fix the structure by realizing diffusion bonds. In this case, the lubricant preferably has a high carbon content, which serves as a catalyst for diffusion bonds of this type. With this special type of technical joining, the joining regions and the subsections overlap one another. This is not generally the case when joining through the use of brazing material, which is the preferred process in the present context.

In accordance with another mode of the invention, after step (b) a bonding agent is fed to the at least one layer in order to produce at least one bonding layer. The bonding agent has the function of at least temporarily fixing material, which is subsequently supplied. This material is to be understood in particular as meaning a brazing material, which is positioned in the vicinity of the contact regions between the layers before the technical joining connection is produced. The bonding agent being used is preferably an adhesive with a high solvent content, e.g. an acetone solvent content of greater than 98% or a comparable ethanol solvent content. The solvent is preferably highly volatile. The bonding agent has a very low tendency toward corrosion, i.e. the metallic layers are not subject to any corrosion in the event of long-term contact with the bonding agent. Moreover, it is advantageous if the bonding agent is thermally stable, i.e. does not lose its bonding properties, up to 300° C. Therefore, any heat pretreatments which may be required are possible up to this temperature range. In special cases, for example if the bonding agent is applied by printing, the bonding agent has an electrical conductivity in a range of from 1.0 to 1.2 mS (milli-Siemens). The viscosity of a bonding agent of this type should be approximately in the range of from 3.5 to 4.4 mPa (milli-Pascals), with these values applying to room temperature and standard atmospheric pressure. The bonding agent layers produced therefrom preferably have a width of from 0.1 to 1.0 mm (millimeters) and in particular are in strip form. Their layer thickness is advantageously in a range of from 0.1 μm to 0.5 μm (micrometers).

In accordance with a further mode of the invention, in this context, the at least one bonding layer is provided in a joining region which is formed adjacent the at least one subsection. The joining region is to be understood in particular as meaning the region at which, in the structure to which brazing material is to be applied, contact with brazing material is possible and also desired. Therefore, the joining region also denotes the region in which brazing material or other coating material is ultimately to be fixed. In principle, it is also possible for the joining region to be partially superimposed with the bonding layer and the subsection to be partially superimposed with the lubricant (e.g. adjacent layers), although it is preferable to form separate regions on the respective metallic layer. This ensures that the desired properties of lubricant and bonding layer do not have an adverse effect on one another, but rather can be permanently maintained throughout the production process.

The joining regions may be disposed offset with respect to one another at least in regions. This is to be understood as meaning in particular that the joining regions of layers of the honeycomb body disposed adjacent one another by way of example are not disposed one behind the other in the radial and/or axial direction. Furthermore, it is possible for the joining regions to be disposed in a chessboard pattern in a cross section through the honeycomb body, in which case contact locations between the layers bearing against one another, in particular repeatedly, rather than joining regions, are provided in the direction in which the layer runs and/or perpendicular with respect thereto. It is very particularly preferable for a joining pattern of this type not to be identical over the length of the honeycomb body, but rather for there to be at least two cross sections which are spaced apart from one another and have different joining patterns.

In accordance with an added mode of the invention, the lubricant is applied by using a drop-on-demand process or a bubble jet process.

The "drop-on-demand" process is a printing process which is distinguished by the fact that the lubricant is applied in drop form to the subsection provided for this purpose. In actual fact, the drop is only generated at the times at which the metallic layer is then immediately to be wetted therewith, unlike in the case of what is known as the continuous inkjet process, in which the drops are produced continuously but only applied from time to time. The "drop-on-demand" process therefore, as it were, represents a discontinuous process for providing drops of lubricant. In other words, this means that the lubricant is applied in such a manner that a relative movement is realized between the layer and the apparatus for carrying out the drop-on-demand process, with the apparatus then only generating and emitting drops precisely when they can be applied to the desired subsection.

With drop-on-demand systems it is possible, for example, to produce individual drops of the bonding agent through the use of piezoelectric actuators. Piezoelectric actuators are usually electromechanical transducers, which are based on the piezoelectric effect. In this case, the application of an alternating voltage to the piezoelectric element leads to mechanical vibrations. These vibrations are transferred to a predetermined volume of lubricant, with a drop in each case being formed at an outlet of the apparatus. The drop is then fed to a nozzle at a relatively high velocity. A number of drop-on-demand processes, which include piezoelectric transducers, for example piezotubes, piezodisks, or piezolamellae, are known.

The "bubble jet" process represents a particularly preferred drop-on-demand process. In this case, the drops of lubricant are produced not through the use of a piezoelectric transducer, but rather by the use of thermal actuators. These are generally heating elements, which are formed in a nozzle and are connected to the lubricant. These heating elements briefly heat a locally restricted region in the nozzle to a very high temperature well above the boiling point of the lubricant. The lubricant then begins to boil locally, with the result that a continuous vapor bubble is formed after a very short time. This vapor bubble expels a drop of the lubricant from the nozzle, it being possible to reach pressures of 10 bar or more and outlet velocities of 10 m/s (meters per second) and more. This vapor bubble then collapses, after which lubricant is again sucked in the nozzle as a result of the capillary forces. In bubble jet processes of this type, a distinction is drawn between different printing techniques, which are inter alia known as edge and side shooter techniques.

In accordance with an additional mode of the invention, the lubricant and additionally also the bonding agent are applied by using a common apparatus. In this way it is possible in principle for the lubricant and the bonding agent to be applied by using different printing techniques, for example the lubricant through the use of a drop-on-demand process and the bonding agent through the use of a continuous inkjet process. However, it is preferable to provide lubricant and bonding agent using one process, in particular a specific drop-on-demand process. This means in particular that the apparatus simultaneously emits both bonding agent and lubricant at defined times, but it is also possible for the different media to be applied in succession through the use of the common apparatus.

In accordance with yet another mode of the invention, oil which is quickly volatilized is applied to the at least one layer prior to step (a), and the oil is substantially volatilized after the deformation operation and in particular by the time step (c) is carried out or the bonding agent is applied. In other words, oil required for the deformation is applied to the surface of the layer immediately prior to the deformation, but is volatilized, i.e. converted into gaseous constituents, after only a very short time following the deformation process. The term very short time is to be understood in particular as meaning a period of time in a range of less than 10 seconds, in particular even less than 5 seconds. The volatilization can be ensured without the need for additional measures, in that the continuously moving layer is not processed further for this period of time, so that during this time the volatilization to the environment can be carried out unimpeded. However, it is also possible to promote the removal of the oil, for example by providing elevated temperatures, chemical substances, and mechanical removal devices, etc.

In accordance with yet a further mode of the invention, step (b) includes at least one of the processes of thermal or mechanical degreasing. Thermal degreasing is to be understood in particular as meaning that a temperature, which is (well) above room temperature, is provided in the vicinity of the layer. At least a considerable proportion of the oil on the surface is volatilized at this temperature. This preferably involves temperatures in a range of from 200° C. to 400° C., in particular in a range of from 250° C. to 300° C. The term mechanical degreasing is to be understood as meaning the use of driven and/or undriven cleaning devices, which are brought into physical contact with the surface of the layer. The contact ensures that oil is collected (in the cleaning device) or removed (from the layer).

In accordance with yet an added mode of the invention, as has already been indicated a number of times above, it is particularly advantageous if the at least one layer is brought into contact with a brazing material at least before or after step (d). Under certain circumstances, it is also possible for brazing material to be applied a number of times. The brazing material is preferably brought into (uncontrolled) contact with the surfaces of the layer forming the structure, in which case brazing material adheres in particular only where a bonding agent has been provided. The remainder of the brazing material is collected and fed back to a subsequent brazing material application process. The brazing material being used is preferably a brazing powder which has a mean brazing material grain size fraction, in particular with a brazing material grain size of less than 106 μm (micrometers). The brazing material preferably includes a nickel-based alloy.

In accordance with yet an additional mode of the invention, step (e) includes a heat treatment of the structure. This is preferably to be understood as meaning a high-temperature vacuum brazing process. This preferably only reaches temperatures which are below the melting point of the material of the metallic layer.

In accordance with again another mode of the invention, the structure is produced from a plurality of smooth foils or sheets and corrugated foils or sheets, in which case step (d) includes the alternate stacking of these foils or sheets, so as to form contact locations which at least in part have at least one portion having the lubricant superimposed on them, with the foils or sheets then at least partially being moved toward one another. In the case of alternating stacking of smooth and corrugated foils or sheets, virtually linear contact locations are generally produced between the foils or sheets disposed next to one another. These contact locations form approximately along the extremes of the corrugation. It is now proposed that the subsection having the lubricant be accurately superimposed on these contact locations. This has the advantage of permitting the foils or sheets to more easily slide along one another in or at these contact locations during subsequent twisting or winding of the stack. This has the advantage of avoiding undesired deformation of the structure or the smooth foils or sheets and/or the corrugated foils or sheets.

In accordance with again a further mode of the invention, it is also preferable to form pockets or nips, in at least a portion of which a bonding layer is provided, adjacent the contact locations. The term pocket is to be understood as meaning the region in the vicinity of the contact locations, which is produced by the adjacent smooth and corrugated foils or sheets. The pocket in particular includes a cross-sectional shape of a corner of a passage etc., which tapers to a point. Finally, it is customary for a technical joining connection to be formed in a region of this pocket, as a brazed joint. For this purpose, it is necessary for a bonding layer to be provided there, ensuring that the brazing material, which adheres to it, accurately collects in this pocket after it has melted during the heat treatment. This is ensured inter alia by a strip of bonding layer, which at least partially projects into the pocket.

In accordance with again an added mode of the invention, the at least one subsection having the lubricant is produced on at least one smooth foil or sheet and the bonding layer is produced on at least one corrugated foil or sheet. This means, for example, that relatively large areas of the smooth foil or sheet can be wetted with the lubricant without the technical joining connections ultimately being affected by it, since the opposite bonding layer ensures sufficient holding force to temporarily fix the brazing material. At the same time, however, it is also ensured that sufficient lubricant is provided even if the foils or sheets are offset with respect to one another.

In accordance with a concomitant mode of the invention, a stack is formed, by providing two externally disposed foils or sheets with lubricant and foils or sheets between them without lubricant. In particular in the event of common deformation or winding and/or coiling of a stack having a plurality of foils or sheets, the greatest relative movements generally occur in the boundary layer. Moreover, these stacks are often also delimited by smooth foils or sheets, so that under certain circumstances a plurality of smooth foils or sheets disposed adjacent one another come to bear directly against one another during production of the structure from a plurality of stacks. In order to minimize the friction in such situations, it is particularly advantage for these boundary layers to be provided with sufficient lubricant.

Other features which are considered as characteristic for the invention are set forth in the appended claims, in which the process steps recited can be combined with one another in any technologically appropriate way, thereby demonstrating further advantageous configurations of the process according to the invention.

Although the invention is illustrated and described herein as embodied in a process for producing a high temperature-resistant structure with application of lubricant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
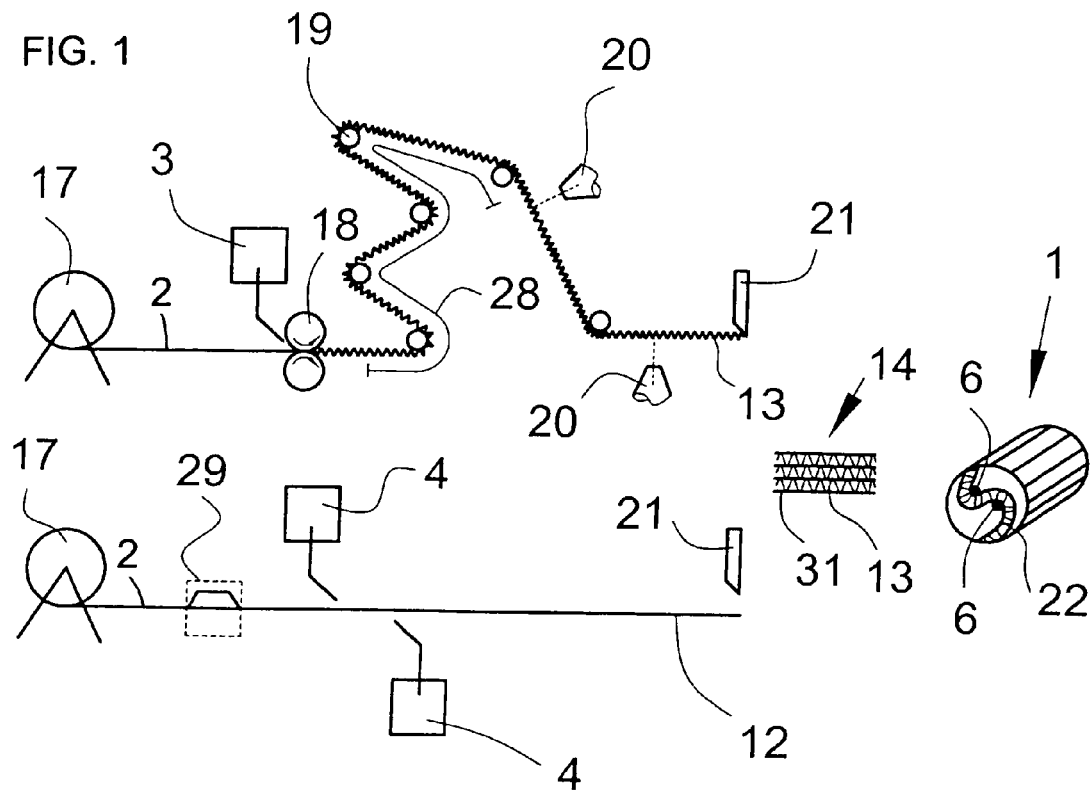
FIG. 1 is a diagrammatic view illustrating a sequence of a process for producing a structure, which is high temperature-resistant.

Referring now to the figures of the drawings in detail and first, particularly, to FIG. 1 thereof, there is seen a diagrammatic illustration of a production of a structure 1 which is high temperature-resistant or able to withstand high temperatures and includes a multiplicity of passages 22 through which an exhaust gas can flow. Metallic layers 2 are wound in an S shape about winding locations 6, so that the structure 1 is ultimately substantially cylindrical in terms of its external configuration. Structures of this type, which are also known as honeycomb bodies, are used in particular for the treatment of exhaust gases from automobiles.

Smooth and corrugated layers 2 are disposed alternately to form a stack 14 for production purposes. These layers are delimited, for example, by externally disposed covering layers 31.

In order to produce a layer 2, in particular a corrugated foil or sheet 13, the smooth layer is, for example, drawn continuously off a coil 17. The layer is then passed to two profile rollers 18 which mesh with one another, with oil 3 that is quickly volatilized being added prior to the deformation step taking place. As a result of the layer 2 being passed through the meshing profile rollers 18, a corrugation is formed. The oil 3 which is present on the sides or the surface is volatilized over a distance 28 over which the corrugated foil or sheet 13 is guided around a plurality of rollers 19. By the time that the processed section of a corrugated foil or sheet 13 reaches a first nozzle 20 for applying bonding agent 7 (shown in FIG. 3), the oil 3 which has been applied is no longer present. Due to the fact that the oil 3 has now been removed, the bonding of a bonding layer 8 (shown in FIGS. 2 and 3) or bonding agent 7 is not adversely affected by this oil. In the case of the continuous process shown herein, first of all bonding agent 7 is applied from one side of the corrugated foil or sheet 13 through the use of a first nozzle 20, and then bonding agent 7 is applied from the other side through the use of a further nozzle 20. In many cases, however, it is sufficient for the corrugated foil or sheet 13 to be provided with bonding agent 7 from just one side. Finally, the corrugated foil or sheet 13 is cut from the strip with a predetermined length through the use of a cutting apparatus 21. The lower half of the figure is a parallel diagrammatic illustration of the provision of smooth metallic layers. Once again, a layer 2 is pulled off a coil 17, with the oil 3 which is present thereon being removed thermally through the use of a furnace 29. Then, a lubricant 4 is applied in a targeted manner to the top side and subsequently also the underside. Once again, the smooth metal strip is then cut into smooth foils or sheets 12 of a predetermined length using a cutting apparatus 21.

The smooth foil or sheet 12 and the corrugated foil or sheet 13 produced in this way are then stacked to form the stack 14, then wound and finally brazed to one another. The application of brazing material can be carried out in the known manner by at least partially introducing the structure 1 into a housing and bringing the entire device into contact with brazing powder, for example from the end side and through the passages which have been formed. Then, the excess brazing material is removed and the apparatus is guided into a furnace, where the actual brazing operation is carried out.

Figure 2:
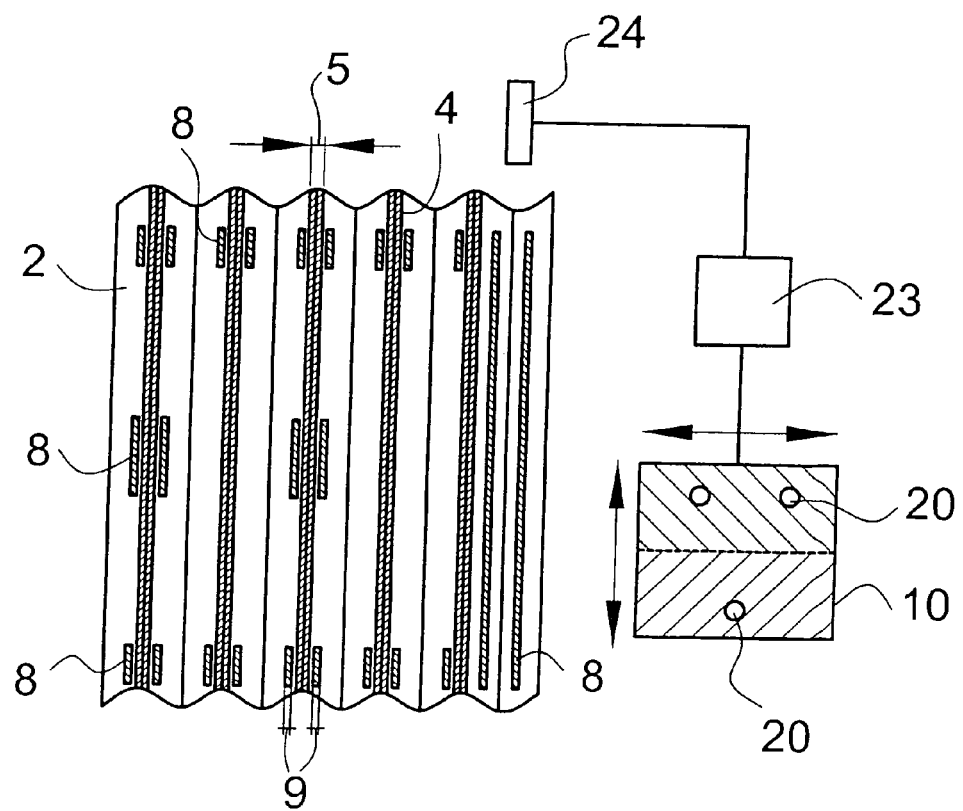
FIG. 2 is a plan view of a layer after it has been processed, with a sectional view and block diagram of an apparatus for applying bonding agents and lubricants.

FIG. 2 is a diagrammatic plan view of a metallic layer 2 which has been configured with a plurality of bonding layers 8 and a plurality of subsections 5 having lubricants 4. The subsections 5 are disposed in such a way that they cover extremes 26 (shown in FIG. 3) of the corrugated layer 2, specifically precisely where contact is produced with an adjacent smooth metallic layer. Adjacent this, the bonding layers 8 are provided in a desired joining region 9. As can be seen from FIG. 2, any desired patterns are possible with regard to the configuration of bonding layers 8 and lubricant layers. In this case, the subsections 5 having the lubricant 4 preferably extend over an entire contact location 15 (shown in FIG. 3) or the entire length of the layer 2, whereas the bonding layer 8 preferably extends only in a locally delimited sub-region in the direction of the extremes 26 or transversely with respect thereto.

In the illustrated embodiment example, lubricant 4 and bonding agent 7 are applied using a common apparatus 10. In order to do this, it is preferable to use what is known as the drop-on-demand process. In order to carry out this process, the apparatus 10 includes a plurality of nozzles 20, which emit either bonding agent 7 or lubricant 4. The apparatus 10 is disposed in such a way that it can move relative to the metallic layer 2, or the layer 2 can move with respect to the apparatus. Then, a layer of bonding agent 8 and/or a layer of lubricant 4 is generated in accordance with the desired pattern on the layer 2 when the respective nozzle 20 is disposed above the layer 2. For this purpose, the apparatus 10 has a drive 23, which is connected, for example, to a memory unit and/or a freely programmable control unit. It is also possible for the drive to be connected to a detector 24, so that it is possible to regulate the supply of lubricant and/or bonding agent to the metallic layer 2. This ensures, for example, that the lubricant 4 or bonding agent 7 is still positioned very accurately in the event of deformation of the layer 2 and/or treatment of different corrugation types.

Figure 3:
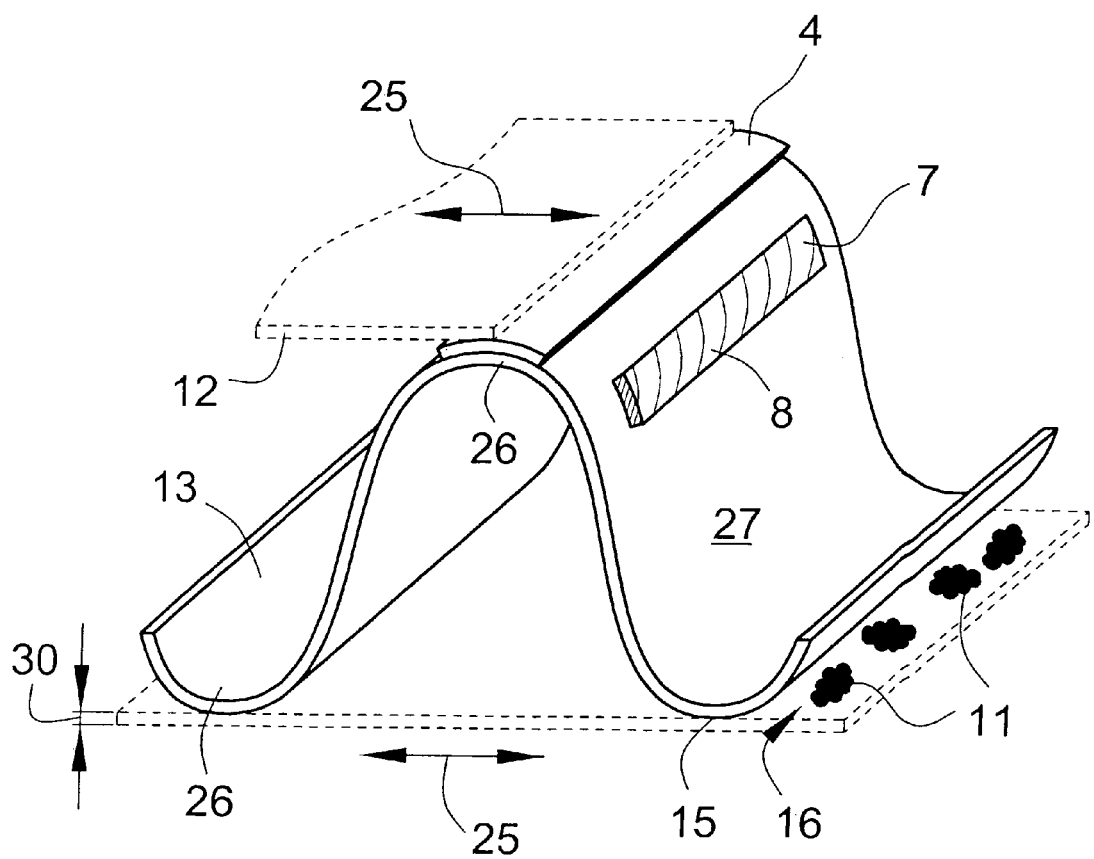
FIG. 3 is an enlarged perspective view of a portion of a corrugated foil or sheet, which has been made ready for a brazing process.

FIG. 3 shows a diagrammatic, perspective view of a portion of a corrugated foil or sheet 13, which is ultimately (as indicated by dashed lines) covered by two smooth foils or sheets 12. The alternately stacked smooth foils or sheets 12 and corrugated foils or sheets 13 form pockets or nips 16 in which the brazed joints are ultimately to be produced. Brazing material 11 is diagrammatically depicted in the right-hand part of FIG. 3, where it is fixed until the heat treatment of the structure 1, in particular as a result of the provision of bonding layers 8.

The corrugated foil or sheet 13 has a corrugation with a profile similar to a sinusoidal profile, which is distinguished by the extremes 26 running substantially parallel to one another. During the subsequent stacking, the extremes 26 produce the contact locations 15 with the adjacent smooth foils or sheets 12. The process described allows lubricant 4 to be provided in a subsection 5, for example in the region of the extremes 26 and/or in the region of the contact location 15. This lubricant 4 promotes a relative movement 25 of the smooth foil or sheet 12 with respect to the corrugated foil or sheet 13. This prevents, for example, mechanical damage to the surface, and makes the winding reliable in terms of the process engineering required for series production. In order to ensure that a permanent technical joining connection is subsequently formed, a bonding layer 8 is provided in the vicinity of the pockets 16 and/or in the vicinity of the extremes 26, preferably as a function of a thicknesses 30 of the layers being used. The bonding layer 8 having the bonding agent 7 in this case is positioned adjacent the lubricant 4. At the same time, brazing material 11 is also prevented from being disposed in the region of the flanks or sides 27, in which simultaneous contact of the brazing material 11 with an adjacent foil or sheet is not subsequently possible.

The accuracy with which the lubricant layer is produced and the accuracy with which the bonding layer 8 delimited by it is produced allow the layers 2 disposed adjacent one another to slide along one another during the winding operation, while at the same time ensuring sufficient, temporary fixing of the brazing material 11 in the interior of the structure 1. This makes it possible to produce structures 1 which are able to withstand particularly high loads. Such structures are used, for example, as carrier bodies for a very wide range of coatings in exhaust systems of mobile internal combustion engines.

What is claimed is:

1. A process for producing a high temperature-resistant structure, the process comprising the following steps:
   (a) deforming at least one smooth metallic layer in a rolling process during which oil at least partially wets the at least one layer, to produce at least one at least partially structured metallic layer;
   (b) at least partially removing the oil from the at least one at least partially structured metallic layer;
   (c) feeding lubricant onto at least one subsection of the at least one at least partially structured metallic layer;
   (d) at least partially shaping the at least one at least partially structured metallic layer into the structure;
   (e) producing technical joining connections for fixing the structure;
   after step (b), feeding a bonding agent to the at least one at least partially structured metallic layer, to produce at least one bonding layer;
   carrying out the step of feeding the bonding agent to produce the at least one bonding layer in a joining region formed adjacent the at least one subsection;
   carrying out step (d) by alternately stacking a plurality of smooth sheets and corrugated sheets forming contact locations at least in part having the at least one subsection with the lubricant superimposed thereon, and then at least partially moving the sheets toward one another; and
   carrying out step (d) by forming a stack having two externally disposed sheets with lubricant and sheets without lubricant between the sheets with lubricant.

2. The process according to claim 1, which further comprises carrying out the step of feeding the lubricant by using a drop-on-demand process or a bubble jet process.

3. The process according to claim 1, which further comprises applying the lubricant and the bonding agent by using a common apparatus.

4. The process according to claim 1, which further comprises applying oil being quickly volatilized to the at least one at least partially structured metallic layer prior to step (a), and substantially volatilizing the oil after the deforming step until carrying out step (c)

5. The process according to claim 1, which further comprises applying oil being quickly volatilized to the at least one at least partially structured metallic layer prior to step (a), and substantially volatilizing the oil after the deforming step until the bonding agent is applied.

6. The process according to claim 1, wherein step (b) includes at least one of thermal or mechanical degreasing processes.

7. The process according to claim 1, which further comprises bringing the at least one at least partially structured metallic layer into contact with a brazing material at least before or after step (d).

8. The process according to claim 1, wherein step (e) includes heat treatment of the structure.

9. The process according to claim 1, which further comprises forming pockets adjacent the contact locations, and providing the bonding layer in at least a portion of the pockets.

10. The process according to claim 1, which further comprises producing the at least one subsection having the lubricant on at least one smooth sheet, and producing the bonding layer on at least one corrugated sheet.

* * * * *